United States Patent
Kimoto et al.

(10) Patent No.: US 8,532,869 B2
(45) Date of Patent: Sep. 10, 2013

(54) VEHICLE DEVICE CONTROLLER AND TEMPERATURE SENSOR ANOMALY DETECTION METHOD THEREFOR

(75) Inventors: Yuji Kimoto, Komaki (JP); Yasuhiro Ishiguro, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 351 days.

(21) Appl. No.: 12/974,362

(22) Filed: Dec. 21, 2010

(65) Prior Publication Data

US 2011/0172876 A1 Jul. 14, 2011

(30) Foreign Application Priority Data

Jan. 11, 2010 (JP) .................................. 2010-003499

(51) Int. Cl.
*G06F 11/30* (2006.01)

(52) U.S. Cl.
USPC ........ 701/34.4; 701/29.7; 701/29.8; 701/29.2

(58) Field of Classification Search
USPC .................... 701/29.2, 29.7, 29.8, 30.8, 31.1, 701/34.4
See application file for complete search history.

(56) References Cited

U.S. PATENT DOCUMENTS

| 7,771,113 | B2 | 8/2010 | Corbet et al. | |
|---|---|---|---|---|
| 2008/0000304 | A1* | 1/2008 | Nagle et al. | ...................... 73/780 |
| 2009/0003405 | A1 | 1/2009 | Corbet et al. | |
| 2009/0114536 | A1 | 5/2009 | Ishiguro et al. | |

FOREIGN PATENT DOCUMENTS

| JP | 56-103793 A | 8/1981 |
|---|---|---|
| JP | 63-145137 U | 9/1988 |
| JP | 2003-286888 A | 10/2003 |
| JP | 2005-240707 A | 9/2005 |
| JP | 2007-211714 A | 8/2007 |
| JP | 2008-008667 A | 1/2008 |
| JP | 2008-39588 A | 2/2008 |
| JP | 2009-133834 A | 6/2009 |
| WO | 2009006436 A1 | 1/2009 |

* cited by examiner

*Primary Examiner* — Gertrude Arthur Jeanglaude

(74) *Attorney, Agent, or Firm* — Sughrue Mion, PLLC

(57) ABSTRACT

There is provided a controller for controlling a vehicle device, which includes a circuit board having mounted thereon a control circuit that controls operations of the vehicle device, a first temperature sensor mounted on a first specific region of the circuit board to output a first signal responsive to a temperature of the first specific region of the circuit board and a second temperature sensor mounted on a second specific region of the circuit board to output a second signal responsive to a temperature of the second specific region of the circuit board. The control circuit has an anomaly detection portion that judges the occurrence or non-occurrence of an output anomaly in the first temperature sensor based on the first and second signals of the first and second temperature sensors.

6 Claims, 8 Drawing Sheets

VEHICLE DEVICE CONTROLLER AND TEMPERATURE SENSOR ANOMALY DETECTION METHOD THEREFOR

BACKGROUND OF THE INVENTION

The present invention relates to a controller for controlling a controlled vehicle device. Hereinafter, the term "controlled vehicle device" refers to a device which is mounted on a vehicle and operated under the control of a controller. (The controller and the controlled vehicle device are sometimes also called a "vehicle device controller" and a "vehicle device", respectively.) The present invention further relates to a method for detecting an anomaly in a temperature sensor mounted on a circuit board of the vehicle device controller.

Various controlled vehicle devices are known including, for example, a NOx sensor for detecting the concentration of NOx in exhaust gas, an oxygen sensor for detecting the concentration of oxygen in exhaust gas and a glow plug for heating a combustion chamber in a diesel engine, as disclosed in Patent Documents 1-3. These vehicle devices are connected to and controlled by a vehicle device controller.

In general, the vehicle device controller includes a circuit board having mounted thereon electronic circuit elements to control operations of the vehicle device. The vehicle device controller often further includes a temperature sensor mounted on the circuit board to detect a temperature of the circuit board and, even if an error or variations occur in the operations of the vehicle device under the influence of the temperature of the circuit board on the electronic circuit elements, collects such an error or variations in the operations of the vehicle device by the detected temperature of the circuit board.

For instance, Patent Document 1 discloses a controller for a NOx sensor that includes a control circuit board and a thermistor (as a circuit board temperature sensor) mounted on the circuit board to detect a temperature of the circuit board and corrects a NOx concentration detection value of the NOx sensor by the detected temperature of the circuit board.

The temperature of the circuit board cannot, however, be detected accurately in the event of an output anomaly (failure) in the temperature sensor. In this case, the NOx sensor controller of Patent Publication 1 cannot correct the NOx concentration detection value of the NOx sensor properly and generates an output signal responsive to the improperly corrected NOx concentration detection value. In order to avoid such a problem, it is required to properly detect the output anomaly (failure) in the temperature sensor.

On the other hand, Patent Document 4 discloses a controller for an engine that includes an ECU, an ECU temperature sensor mounted on the inside of the ECU to detect the inside temperature of the ECU (as a circuit board temperature sensor) and an exhaust temperature sensor fixed to an exhaust pipe of the engine to detect the temperature of exhaust gas in the exhaust pipe and, when the difference between a detection value of the ECU temperature sensor and a detection value of the exhaust temperature sensor is greater than a threshold value, judges the occurrence of an output anomaly (failure) in the ECU temperature sensor. Namely, the engine controller of Patent Document 4 is configured to detect the output anomaly in the circuit board temperature sensor based on the detection value of the circuit board temperature sensor and the detection value of the other temperature sensor located separately from the circuit board temperature sensor.

Patent Document 1: JP 2009-133834A
Patent Document 2: JP 2008-008667A
Patent Document 3: JP 2005-240707A
Patent Document 4: JP 2007-211714A

SUMMARY OF THE INVENTION

The vehicle on which the vehicle device controller is mounted has a plurality of heat generating devices such as an engine, a diesel particulate filter (DPF) and a selective catalytic reduction (SCR) unit so that the output signal of the temperature sensor is influenced by heat from these heat generating devices. When a plurality of temperature sensors are located in different positions, the influences of the heat from the heat generating devices on the output signals of the temperature sensors vary significantly depending on the positions of the temperature sensors. In the case where the circuit board temperature sensor and the other temperature sensor are located inside and outside of the circuit board as in Patent Document 4, there thus arises a possibility that the vehicle device controller may not be able to properly detect the output anomaly (failure) in the circuit board temperature sensor based on the output signal of the circuit board temperature sensor and the output signal of the other temperature sensor under the influence of the heat from the heat generating devices.

In view of the foregoing, it is an object of the present invention to provide a vehicle device controller that has a circuit board and a circuit board temperature sensor mounted on the circuit board and, even under the circumstance that there are heat generating devices located around the vehicle device controller, properly detects an output anomaly (failure) in the circuit board temperature sensor. It is also an object of the present invention to provide a method for detecting an output anomaly (failure) in a temperature sensor mounted on a circuit board of a vehicle device controller.

According to an aspect of the present invention, there is provided a controller for controlling a vehicle device, comprising: a circuit board having mounted thereon a control circuit that controls operations of the vehicle device; a first temperature sensor mounted on a first specific region of the circuit board to output a first signal responsive to a temperature of the first specific region of the circuit board; and a second temperature sensor mounted on a second specific region of the circuit board to output a second signal responsive to a temperature of the second specific region of the circuit board, the control circuit having an anomaly detection portion that judges the occurrence or non-occurrence of an output anomaly in the first temperature sensor based on the first and second signals of the first and second temperature sensors.

According to another aspect of the present invention, there is provided a temperature sensor anomaly detection method for a vehicle device controller, the vehicle device controller having a circuit board mounting thereon a control circuit to control operations of a vehicle device and a temperature sensor mounted on a first specific region of the circuit board to output a signal responsive to a temperature of the first specific region of the circuit board, the temperature sensor anomaly detection method comprising: mounting a functional element on a second specific region of the circuit board, the functional element having an electrical property that changes with a temperature thereof to output a signal responsive to a temperature of the second specific region of the circuit board; and judging the occurrence or non-occurrence of an output anomaly in the temperature sensor based on the output signal of the temperature sensor and the output signal of the functional element.

The other objects and features of the present invention will also become understood from the following description.

DESCRIPTION OF THE EMBODIMENTS

Figure 1:
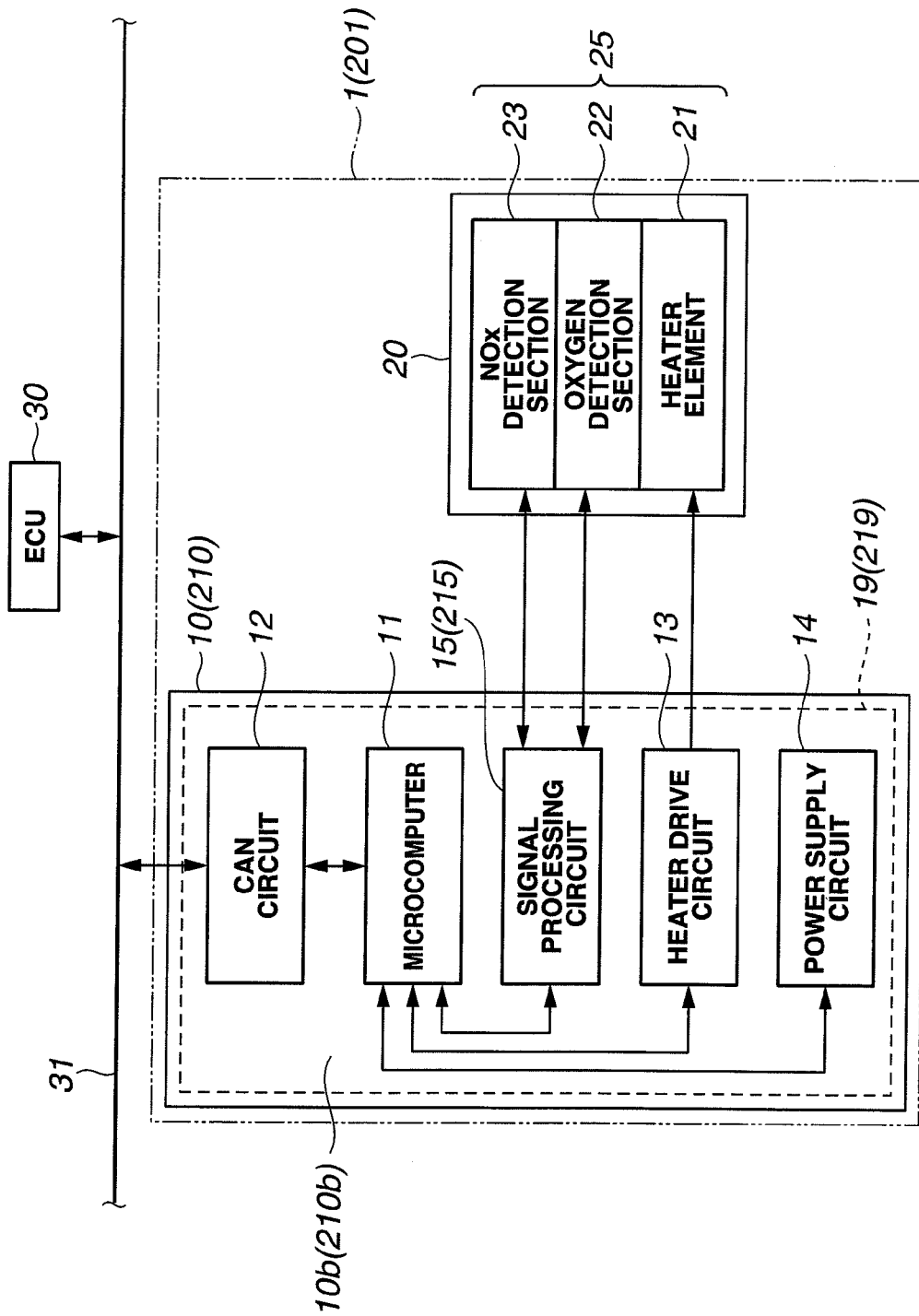
FIG. 1 is a schematic view of a NOx sensor system with a NOx sensor and a NOx sensor controller according to first and second embodiments of the present invention.

The present invention will be described in detail below by way of the following first and second embodiments, in which like parts and portions are designated by like reference numerals to avoid repeated explanations thereof.

First Embodiment

The first embodiment of the present invention specifically refers to, but is not limited to, a NOx sensor system 1 for a vehicle that is provided with a NOx sensor controller 10 (as a vehicle device controller) and a NOx sensor 20 (as a controlled vehicle device) as shown in FIG. 1.

The NOx sensor 20 is fixed to e.g. an exhaust pipe of an internal combustion engine of the vehicle at a position downstream of a NOx selective catalytic reduction (SCR) unit so as to detect the concentration of NOx in exhaust gas that has passed through the SCR unit. The NOx sensor 20 is herein designed to simultaneously detect the concentration of oxygen in the exhaust gas (see e.g. JP 2009-133834A).

As shown in FIG. 1, the NOx sensor 20 has a plate-shaped sensor body 25 including a heater element 21 and a sensor element equipped with an oxygen detection section 22 and a NOx detection section 23. In the first embodiment, the sensor body 25 has a laminated structure in which the heater element 21 and the sensor element are laminated to each other (see e.g. FIG. 2 of JP 2009-133834A).

The heater element 21 has a pair of insulation layers formed predominantly of e.g. alumina and a heater pattern formed predominantly of e.g. platinum and embedded between the insulation layers.

The sensor element has a plurality of cells, each of which consists of an oxygen-ion conductive solid electrolyte layer formed predominantly of e.g. zirconia and a pair of electrodes formed predominantly of e.g. platinum. One of the cells constitutes the oxygen detection section 22 through which electric current flows according to the oxygen concentration of the exhaust gas, whereas the other one of the cells constitutes the NOx detection section 23 through which electric current flows according to the NOx concentration of the exhaust gas.

There are defined, in the sensor element, a first measurement chamber adjacent to the oxygen detection section 22 and a second measurement chamber in communication with the first measurement chamber and adjacent to the NOx detection section 23 with one of the electrodes of the NOx detection section 23 located inside of the second measurement chamber and the other electrode of the NOx detection section 23 located outside of the second measurement chamber.

The sensor element is heated and activated by the heater element 21 and operated as follows under the control of the NOx sensor controller 10.

When the exhaust gas is introduced to the first measurement chamber, the oxygen detection section 22 exerts an oxygen pumping action against the first measurement chamber upon energization thereof so as to adjust the oxygen concentration of the exhaust gas in the first measurement chamber to a given level. The resulting oxygen concentration adjusted exhaust gas is fed to the second measurement chamber. With the application of a constant voltage between the electrodes of the NOx detection section 23, the NOx detection section 23 causes dissociation of NOx in the gas in the second measurement chamber into nitrogen and oxygen and exerts an oxygen pumping action against the second measurement chamber so as to pump the dissociated oxygen out from the second measurement chamber. The oxygen concentration and NOx concentration of the exhaust gas can be thus detected according to the flows of electric currents through the oxygen detection section 22 and the NOx detection section 23, respectively, under the above operations of the sensor element.

Figure 2:
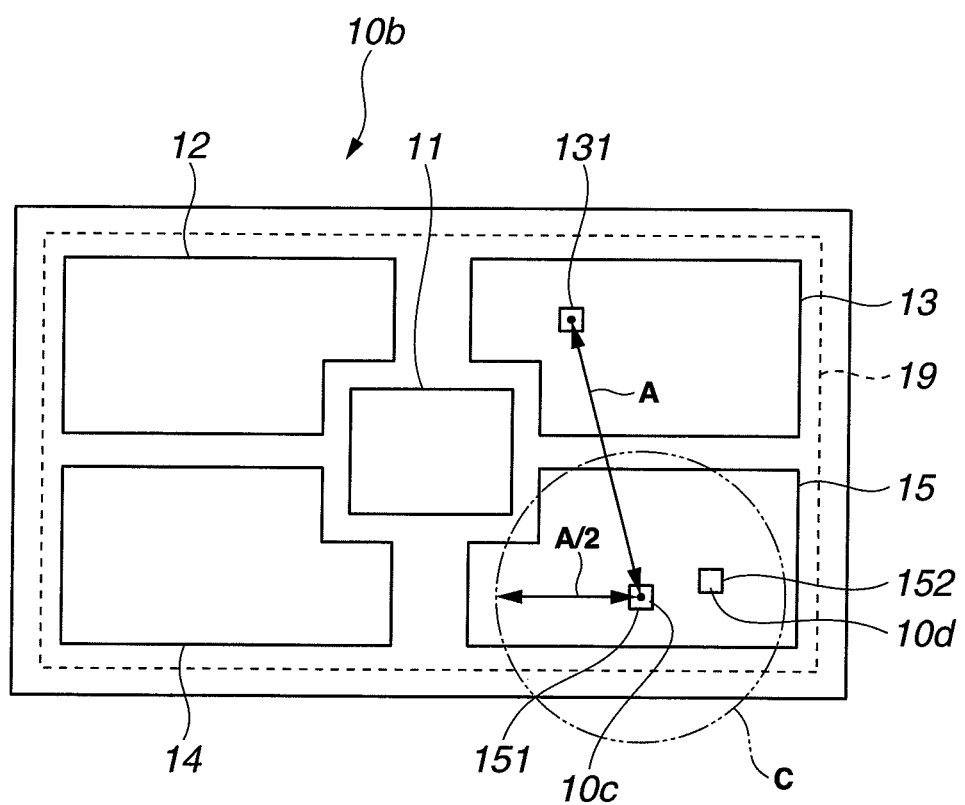
FIG. 2 is a schematic view of a circuit board of the NOx sensor controller according to the first embodiment of the present invention.

As shown in FIGS. 1 and 2, the NOx sensor controller 10 has a circuit board 10b mounting thereon a control circuit 19 that contains a CAN circuit block 12, a heater drive circuit block 13, a power supply circuit block 14, a signal processing circuit block 15 and a microcomputer 11. Each of the CAN circuit block 12, the heater drive circuit block 13, the power supply circuit block 14 and the signal processing circuit block 15 is made up of electronic circuit elements and electrically connected to the microcomputer 11.

The power supply circuit block 14 is electrically connected to a battery (not shown) so as to stabilize a power output of the battery and thereby provide a stable power supply to the microcomputer 11 and then to the CAN circuit block 12, the heater drive circuit block 13 and the signal processing circuit block 15.

The CAN circuit block 12 is electrically connected to an engine control unit (ECU) 30 through a control area network (CAN) 31 so as to allow data transmission (signal transmission) between the ECU 30 and the microcomputer 11.

The heater drive circuit block 13 and the signal processing circuit block 15 are electrically connected to the heater element 21 and the sensor element (the oxygen detection section 22 and the NOx detection section 23) of the NOx sensor 20, respectively, so as to perform energization control of the heater element 21 and the sensor element.

The microcomputer 11 is made up of a CPU, a ROM, a RAM and the like so as to control the operations of the NOx sensor 20 (the heater element 21 and the sensor element) through the heater drive circuit block 13 and the signal processing circuit block 15, determine the oxygen concentration detection value and NOx concentration detection value of the NOx sensor 20 according to the flows of electric currents through the oxygen detection section 22 and the NOx detection section 23 and output the sensor detection results to the ECU 30. More specifically, the microcomputer 11 initiates its control program to control the NOx sensor 20 upon receipt of a communication start signal from the ECU 30 through the CAN 31 and the CAN circuit block 12. The microcomputer 11 performs energization control of the heater element 21 through the heater drive circuit block 13 so that the sensor element becomes heated to and maintained at an activation temperature by the heater element 21. Upon judging that the sensor element has been activated, the microcomputer 11 performs energization control of the sensor element (the oxygen detection section 22 and the NOx detection section 23) through the signal processing circuit block 15 so that the sensor element generates and outputs the NOx and oxygen concentration detection values.

Figure 3:
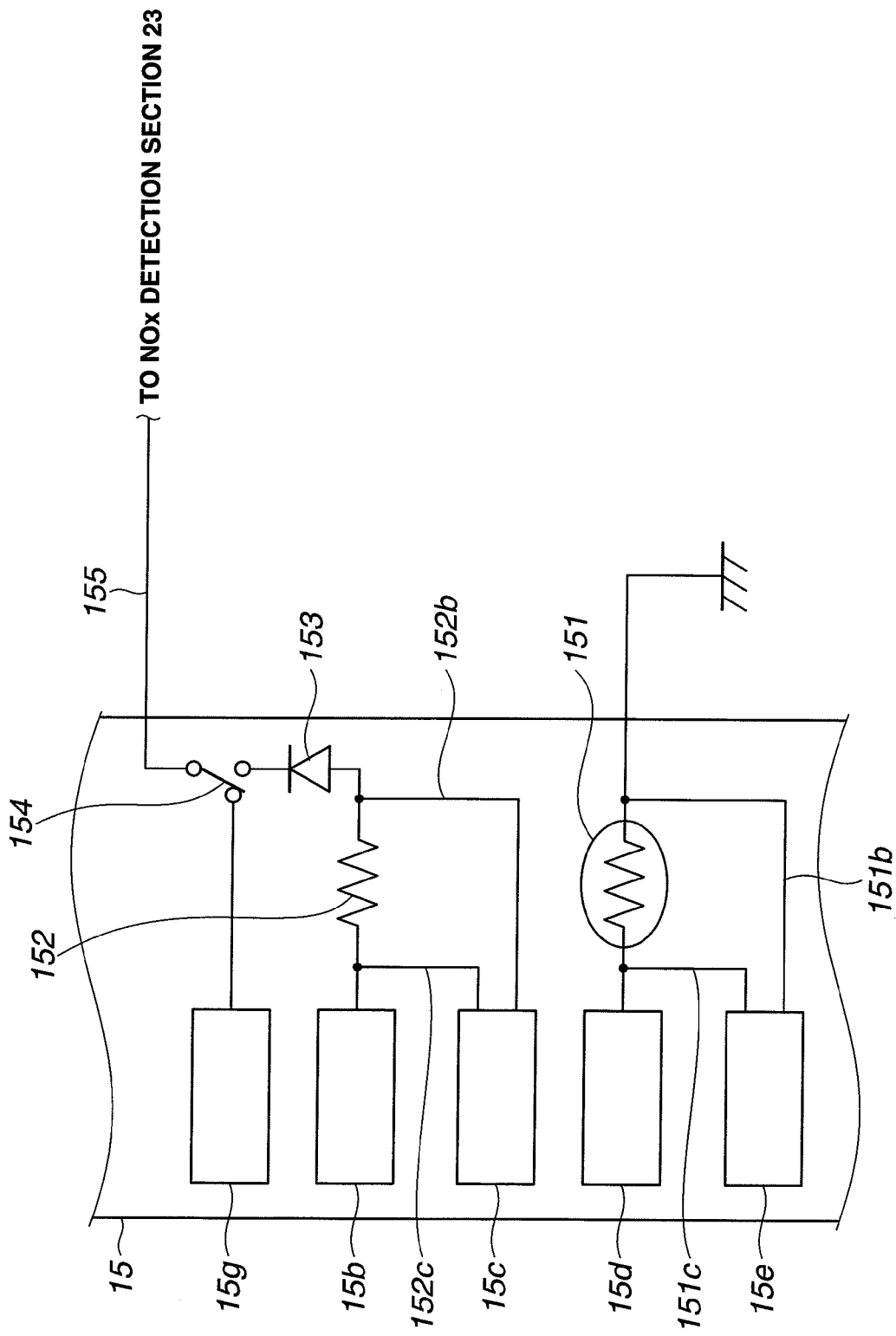
FIG. 3 is an enlarged view of a signal processing circuit block of the circuit board of the NOx sensor controller according to the first embodiment of the present invention.

As shown in FIG. 3, the signal processing circuit block 15 has a constant-voltage supply section 15g, a constant-current supply section 15b, a switch 154, a resistive element 152 and a diode 153 in the first embodiment.

The constant-voltage supply section 15g is connected to the NOx detection section 23 through the switch 154 so as to supply the constant voltage to the NOx detection section 23 through a lead 155 for NOx concentration detection.

The constant-current supply section 15b is also connected to the NOx detection section 23 through the switch 154 so as to supply a constant current to the NOx detection section 23 through the lead 155 for a predetermined time period before the NOx concentration detection (i.e. before the supply of the constant voltage from the constant-voltage supply section 15g to the NOx detection section 23) and thereby pump a given amount of oxygen out of the second measurement chamber by the oxygen pumping action of the NOx detection section 23. This makes it possible to eject residual oxygen from the second measurement chamber forcefully in a short time and shorten the stabilization time of the sensor element for early NOx concentration measurement.

The switch 154 is switched by the microcomputer 11 to connect to either the constant-voltage supply section 15g or the constant-current supply section 15b. More specifically, the switch 154 is switched to the constant-current supply section 15b by the microcomputer 11 so as to establish an electrical connection from the constant-current supply section 15b to the NOx detection section 23 for the predetermined time period after the startup of the NOx sensor controller 10. After that, the switch 154 is switched to the constant-voltage supply section 15g by the microcomputer 11 so as to establish an electrical connection from the constant-voltage supply section 15g to the NOx detection section 23.

The resistive element 152 and the diode 153 are connected in series between the constant-current supply section 15b and the switch 154 (or equivalently, between the constant-current supply section 15b and the NOx detection section 23). The resistive element 152 serves as a current regulator to regulate the flow of electric current from the second constant-current supply section 15b to the NOx detection section 23 and thereby protect the NOx detection section 23 from overcurrent. The diode 153 serves as a backflow current preventing element to prevent the backflow of electric current from the NOx detection section 23 to the second constant-current supply section 15b.

Herein, there is a possibility that an error or variations could occur in the detection value of the NOx sensor 20 when the electronic circuit elements of the control circuit 19 (notably, the electronic circuit elements of the signal processing circuit block 15) are influenced by the temperature of the circuit board 10b of the NOx sensor controller 10.

In order to avoid such an error and variations, the NOx sensor controller 10 is configured to correct the detection value of the NOx sensor 20 by the temperature of the circuit board 10b.

More specifically, the NOx sensor controller 10 has a first temperature sensor 151 mounted on a first specific region 10c of the circuit board 10b as shown in FIGS. 2 and 3 to detect a temperature of the first specific region 10c of the circuit board 10b (hereinafter just referred to as the "first temperature T1" of the circuit board 10b) and output a first signal responsive to the first temperature T1 of the circuit board 10b. The first temperature sensor 151 is made up of a chip resistor type thermistor, which has an electrical resistance that changes with temperature, in the first embodiment. There thus develops a voltage between terminals of the first temperature sensor 151 in accordance with the first temperature T1 of the circuit board 10b by the supply of a constant current to the first temperature sensor 151. This terminal voltage of the first temperature sensor 151 is outputted as the first signal. As will be explained later, the first temperature sensor 151 is supplied with the constant current to output the first signal during the supply of the constant current from the constant-current supply section 15b to the NOx detection section 23 through the resistive element 152.

The NOx sensor controller 10 also has a constant-current supply section 15d electrically connected to the first temperature sensor 151 to supply the constant current to the first temperature sensor 151 and a first signal detection section 15e electrically connected to the first temperature sensor 151 through signal lines 151b and 151c to retrieve the first signal from the first temperature sensor 151, as shown in FIGS. 2 and 3, whereby the microcomputer 11 can determine the first temperature T1 of the circuit board 10b based on the first signal and then correct the detection value of the NOx sensor 20 by the first temperature T1.

As shown in FIG. 3, the first temperature sensor 151, the constant-current supply section 15d and the first signal detection section 15e are incorporated in the signal processing circuit block 15 in the first embodiment. Further, the first specific region 10c of the circuit board 10b is a constituent part of the signal processing circuit block 15 of the control circuit 19 as shown in FIG. 2.

In the event of an output anomaly (failure) in the first temperature sensor 151, however, the microcomputer 11 fails to detect the first temperature T1 of the circuit board 11b accurately and, as a result, cannot correct the sensor detection value properly and outputs the improperly corrected sensor detection value.

In order to avoid such a problem, the NOx sensor controller 10 is configured to detect the output anomaly (failure) in the first temperature sensor 151.

Figure 4:
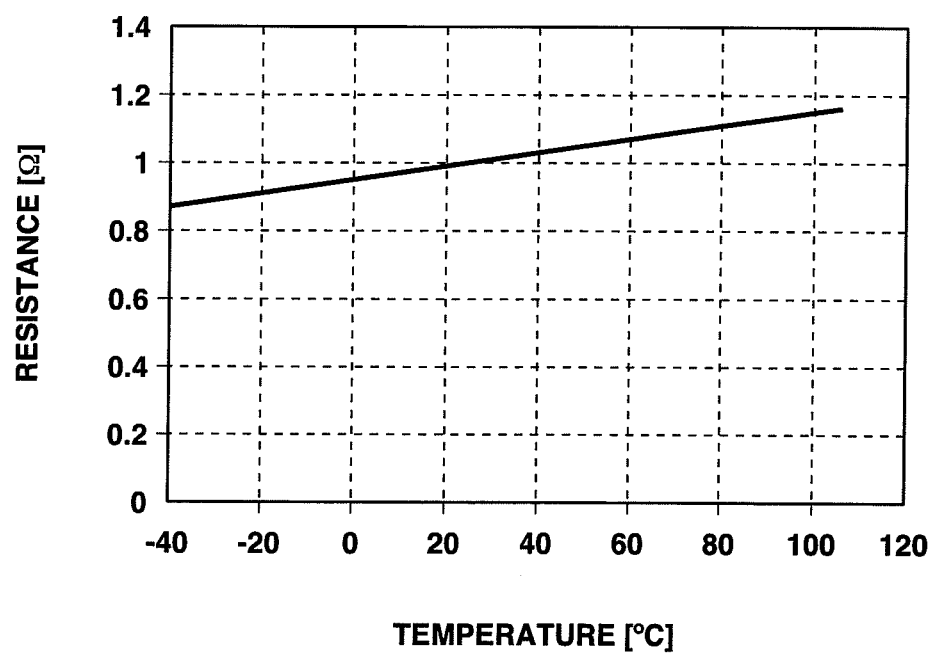
FIG. 4 is a temperature characteristic diagram of a second temperature sensor (resistive element) of the NOx sensor controller according to the first embodiment of the present invention.

For such a sensor anomaly detection configuration, the NOx sensor controller 10 (the control circuit 19) uses the resistive element 152 as not only the current regulator but also a second temperature sensor in the first embodiment. As shown in FIG. 2, the resistive element 152 is also a constituent part of the signal processing circuit block 15 but is mounted on a second specific region 10d of the circuit board 10b that is different in position from the first specific region 10c of the circuit board 10b. Further, the resistive element 152 exhibits changes in electrical resistance with changes in temperature as shown in FIG. 4. There thus develops a voltage between terminals of the resistive element 152 in accordance with the temperature of the second specific region 10d of the circuit board 10b (hereinafter referred to as the "second temperature T2" of the circuit board 10b) during the supply of the constant current from the constant-current supply section 15b to the NOx detection section 23 through the resistive element 152. This terminal voltage of the resistive element (second temperature sensor) 152 is outputted as a second signal responsive to the second temperature T2 of the circuit board 10b.

As shown in FIG. 3, the NOx sensor controller 10 also has a second signal detection section 15c incorporated in the signal processing circuit block 15 and electrically connected to the resistive element 152 through signal lines 152b and 152c to retrieve the second signal from the resistive element 152 and amplify the second signal, whereby the microcomputer 11 can determine the second temperature T2 of the circuit board 10b based on the amplified second signal and judge the occurrence or non-occurrence of the output anomaly (failure) in the first temperature sensor 151 based on the first and second temperatures T1 and T2 of the circuit board 10b.

There is no particular limitation on how to judge the occurrence of the output anomaly (failure) in the first temperature sensor 151 based on the first and second temperatures T1 and T2 of the circuit board 10b.

In the first embodiment, the microcomputer 11 calculates a temperature difference (the absolute value of the difference) $\Delta T$ between the first and second temperatures T1 and T2 ($\Delta T = |T1 - T2|$) and checks whether the temperature difference $\Delta T$ is within a predetermined range of e.g. 20° C. or smaller. As explained above, the first and second temperatures T1 and T2 are the temperatures of the different regions 10c and 10d of the same circuit board 10b. The difference $\Delta T$ between these temperatures T1 and T2 does not thus become so large as long as the first temperature sensor 151 and the resistive element (second temperature sensor) 152 are operating normally. The microcomputer 11 thus judges that, when the temperature difference $\Delta T$ is not within the predetermine range, the output anomaly (failure) is occurring in the first temperature sensor 151. This enables proper and easy detection of the output anomaly (failure) in the first temperature sensor 151.

It is alternatively feasible to compare the changing trend of the first signal (the trend in which the first temperature T1 increases or decreases) with the changing trend of the second signal (the trend in which the second temperature T2 increases or decreases) and, when there is a great difference between the changing trends of the first and second signals, e.g., when it is assumed from the changing trends of the first and second signals that the first temperature T1 increases (decreases) whereas the second signal T2 decreases (increases), judge that the output anomaly (failure) is occurring in the first temperature sensor 151.

Figure 5:
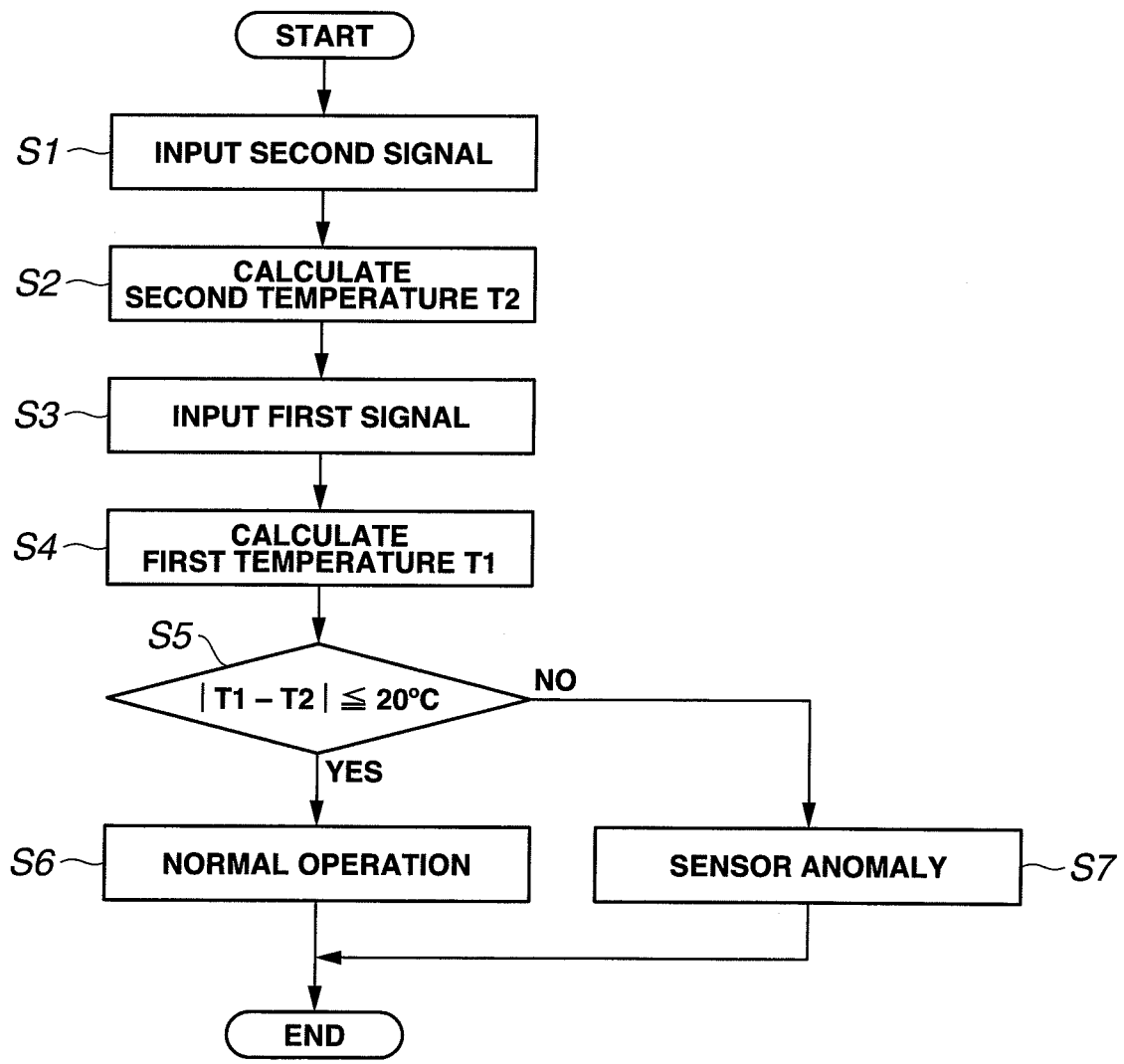
FIG. 5 is a flowchart of a process for detecting an anomaly in a first temperature sensor of the NOx sensor controller according to the first embodiment of the present invention.

The above sensor anomaly detection process is executed by the following procedure as shown in FIG. 5 during the period in which the switch 154 is in connection with the constant-current supply section 15b (i.e. the period in which the second signal is outputted by the resistive element 152 during the supply of the constant current from the constant-current supply section 15b through the resistive element 152).

At step S1, the microcomputer 11 receives input of the second signal from the resistive element (second temperature sensor) 152. The process proceeds to step S2.

At step S2, the microcomputer 11 calculates the second temperature T2 of the circuit board 10b based on the second signal. The process proceeds to step S3.

At step S3, the microcomputer 11 receives input of the first signal from the first temperature sensor 151. The process proceeds to step S4.

At step S4, the microcomputer 11 calculates the first temperature T1 of the circuit board 10b based on the first signal. The process proceeds to step S5.

At step S5, the microcomputer 11 checks whether the temperature difference (the absolute value of the difference) $\Delta T$ between the first and second temperatures T1 and T2 is within the predetermined range of e.g. 20° C. or smaller. If the temperature difference $\Delta T$ is within the predetermined range (Yes at step S5), the process goes to step S6. If the temperature difference $\Delta T$ is not within the predetermined range (No at step S5), the process goes to step S7.

At step S6, the microcomputer 11 judges that the first temperature sensor 151 is operating normally. The process then goes to end.

At step S7, the microcomputer 11 judges that the output anomaly (failure) is occurring in the first temperature sensor 151 and outputs to the ECU 30 an sensor anomaly signal indicating the occurrence of the output anomaly (failure) in the first temperature sensor 151. Upon receipt of the sensor anomaly signal, the ECU 30 generates a warning signal (e.g. light signal) to inform a vehicle drive of the occurrence of the output anomaly (failure) in the first temperature sensor 151 and urge the vehicle driver to replace or repair the failed circuit board 10b (NOx sensor system 1). It is therefore possible to detect the first temperature T1 of the circuit board 10b accurately and correct the sensor detection value properly according to the accurately detected first temperature T1 of the circuit board 10b by replacing or repairing the failed circuit board 10b.

In this way, the operations of steps S5 to S7 of the microcomputer 11 correspond to an anomaly detection portion (or means) in the first embodiment.

By the way, the vehicle on which the NOx sensor controller 10 is mounted has a plurality of heat generating devices such as engine, diesel particulate filter (DPF) and SCR unit located around the NOx sensor controller 10.

As already explained before, a conventional controller has a circuit board temperature sensor mounted on a circuit board and another temperature sensor mounted on the outside of the circuit board and presents a problem that the influences of heat from the external heat generating devices on the output signal of the circuit board temperature sensor and the output signal of the other temperature sensor vary significantly so that the occurrence of an output anomaly in the circuit board temperature sensor may not be detected properly based on the output signals of those temperature sensors.

In the first embodiment, by contrast, the first temperature sensor 151 and the resistive element (second temperature sensor) 152 are mounted at different positions on the same circuit board 10b of the NOx sensor controller 10. It is accordingly possible to, even under the circumstance that the external heat generating devices are located around the NOx sensor controller 10 so that the NOx sensor controller 10 is influenced by heat from the external heat generating devices, decrease and minimize the difference between the influences of the heat from the external heat generating devices on the first signal of the first temperature sensor 151 and on the second signal of the resistive element (second temperature sensor) 152 and detect the output anomaly (failure) in the first temperature sensor 15 properly.

Further, the resistive element 152 is used not only as the current regulator to regulate the current flow from the constant-current supply section 15b to the NOx detection section 23 and protect the NOx detection section 23 from overcurrent but also as the second temperature sensor to detect the second temperature T2 of the circuit board 10b in the first embodiment. It can be said that the resistive element 152 is a functional element having multiple functions, i.e., current regulating function and temperature detecting function. The use of such a multi-functional element eliminates the need to provide another temperature detecting element such as a thermistor separately as the second temperature sensor and makes it possible to reduce the number of component parts of the NOx sensor controller 10. It is thus preferable to use the multi-functional element so that the multi-functional element performs its temperature detecting function to serve as the second temperature sensor while performing any function or functions other than the temperature detecting function (i.e. to make use of two or more functions including temperature detecting function of the multi-functional element).

Although the resistive element 152 is used as the second temperature sensor in the first embodiment, any other multi-functional element whose electrical property changes with temperature can alternatively be used as the second temperature sensor as will be explained later.

It is further alternatively feasible to provide a functional element having only a temperature detecting function, such as a thermistor, separately on the circuit board 10b as the second temperature sensor for the purpose of judging the occurrence or non-occurrence of the output anomaly (failure) in the first temperature sensor 151.

Furthermore, the electric circuit elements of the circuit board 10b include a heat generating element 131. The term "heat generating element" refers to one of the electric circuit elements that is mounted on the circuit board 10b and, when driven, generates heat and thereby reaches the highest temperature among the electric circuit elements on the circuit board 10b. In the first embodiment, a FET (field-effect transistor) of the heater drive circuit block 13 corresponds to the heat generating element 131. The first signal of the first temperature sensor 151 and the second signal of the resistive element (second temperature sensor) 152 are also influenced by heat generated from the heat generating element 131. When there is a great difference between the distance from the heat generating element 131 to the first temperature sensor 151 and the distance from the heat generating element 131 to the resistive element 152, the influence of the heat from the heat generating element 131 on the first signal of the first temperature sensor 151 differs largely from that on the second signal of the resistive element 152. As a result, the output anomaly in the first temperature sensor 151 may not be detected accurately based on these first and second signals.

In the first embodiment, the resistive element 152 is thus located within a circle C having a radius of A/2 from the first temperature sensor 151 where A is the center-to-center distance between the heat generating element 131 and the first temperature sensor 151 as shown in FIG. 2. In other word, the distance between the heat generating element 131 and the resistive element 152 is preferably set to the range of A/2 to 3A/2 (0.5 to 1.5 times the distance A between the heat generating element 131 and the first temperature sensor 151). By satisfaction of such a positional relationship, it is possible to decrease the difference between the influences of the heat from the heat generating element 131 on the first signal of the first temperature sensor 151 and on the second signal of the resistive element (second temperature sensor) 152 and detect the output anomaly (failure) in the first temperature sensor 15 properly even when the heat generating element 131 is mounted on the circuit board 10b.

Second Embodiment

The second embodiment refers to a NOx sensor system 201 for a vehicle that is provided with a NOx sensor controller 210 (as a vehicle device controller) and a NOx sensor 20 (as a controlled vehicle device) as indicated by reference numerals inside the parentheses in FIG. 1. The NOx sensor system 201 of the second embodiment is structurally similar to the NOx sensor system 1 of the first embodiment. The following explanations will be thus focused on the differences between the first and second embodiments.

As shown in FIG. 1, the NOx sensor controller 210 includes a circuit board 210b mounting thereon a control circuit 219 that has the same configuration as that of the control circuit 19 except for a signal processing circuit block 215.

Figure 7:
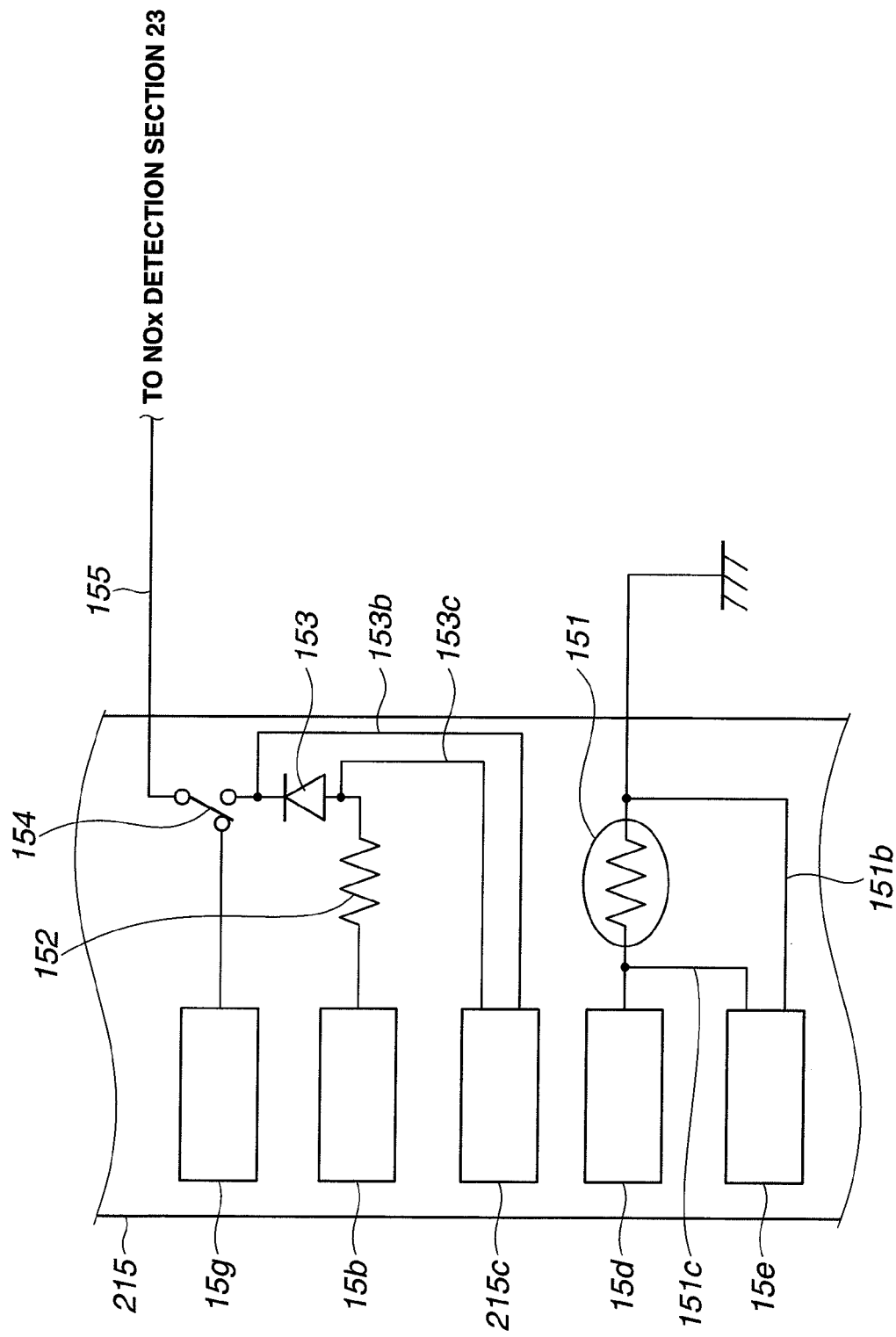
FIG. 7 is an enlarged view of a signal processing circuit block of the circuit board of the NOx sensor controller according to the second embodiment of the present invention.

In the second embodiment, the signal processing circuit block 215 has a constant-voltage supply section 15g, a constant-current supply section 15b, a switch 154, a resistive element 152 and a diode 153 as shown in FIG. 7.

The connection of the switch 154 is switched between the constant-current supply section 15b and the constant-voltage supply section 15g by the microcomputer 11. The switch 154 is switched to the constant-current supply section 15b so as to supply a predetermined constant current to the NOx detection section 23 through a lead 155 for a predetermined time period after the startup of the NOx sensor controller 10 and thereby eject residual oxygen from the second measurement chamber forcefully in a short time for early NOx concentration measurement. After that, the switch 154 is switched to the constant-voltage supply section 15g so as to supply a constant voltage to the NOx detection section 23 through the lead 155 for NOx concentration detection.

The resistive element 152 and the diode 153 are connected in series between the constant-current supply section 15b and the switch 154 (or equivalently, between the constant-current supply section 15b and the NOx detection section 23). The resistive element 152 serves as a current regulator to protect the NOx detection section 23 from overcurrent from the second constant-current supply section 15b. The diode 153 serves as a backflow current preventing element to prevent the backflow of electric current from the NOx detection section 23 to the second constant-current supply section 15b.

Figure 6:
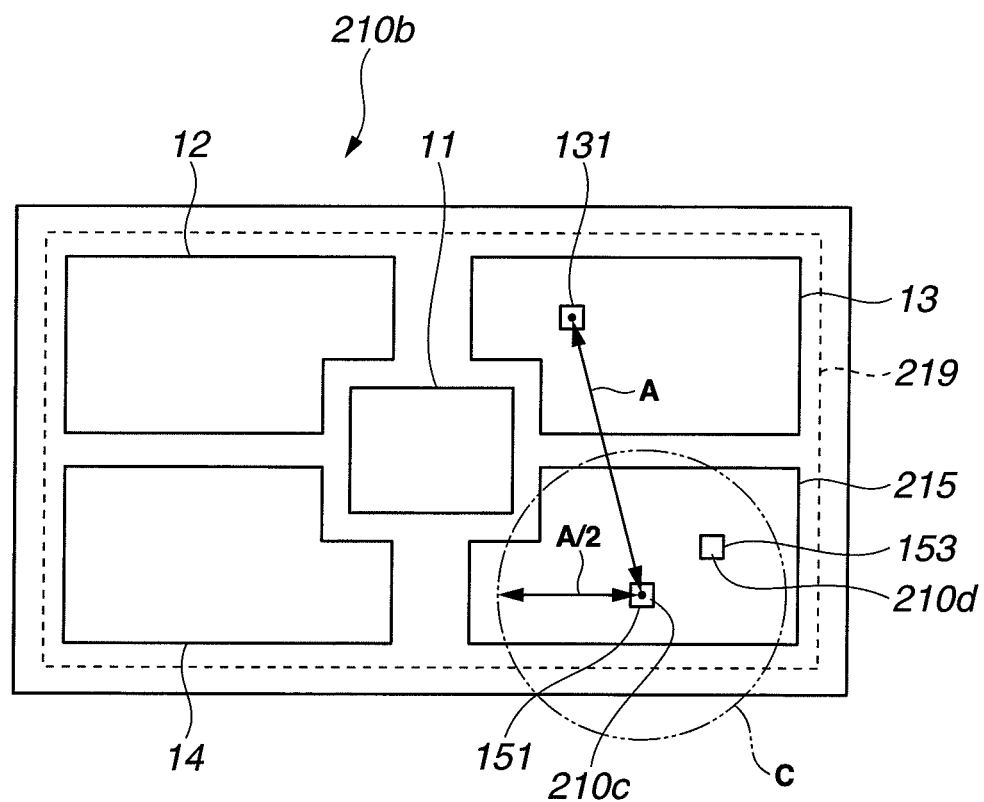
FIG. 6 is a schematic view of a circuit board of the NOx sensor controller according to the second embodiment of the present invention.

The NOx sensor controller 210 also has a first temperature sensor 151 mounted on a first specific region 210c of the circuit board 210b, a constant-current supply section 15d electrically connected to the first temperature sensor 151 and a first signal detection section 15e electrically connected to the first temperature sensor 151 through signal lines 151b and 151c as shown in FIG. 7. As shown in FIG. 6, the first specific region 210c of the circuit board 210b is a constituent part of the signal processing circuit block 215 in the second embodiment as in the case of the first embodiment. Further, the first temperature sensor 151 is made up of a chip resistor type thermistor in the second embodiment as in the case of the first embodiment. There thus develops a voltage between terminals of the first temperature sensor 151 in accordance with a temperature of the first specific region 210c of the circuit board 210b (hereinafter referred to as the "first temperature T1" of the circuit board 210b) by the supply of a constant current from the constant-current supply section 15d to the first temperature sensor 151. The terminal voltage of the first temperature sensor 15 is outputted as a first signal responsive to the first temperature T1 of the circuit board 210b through the first signal detection section 15e to the microprocessor 11, whereby the microcomputer 11 can determine the first temperature T1 of the circuit board 210b based on the first signal and then correct the detection value of the NOx sensor 20 by the first temperature T1.

Figure 8:
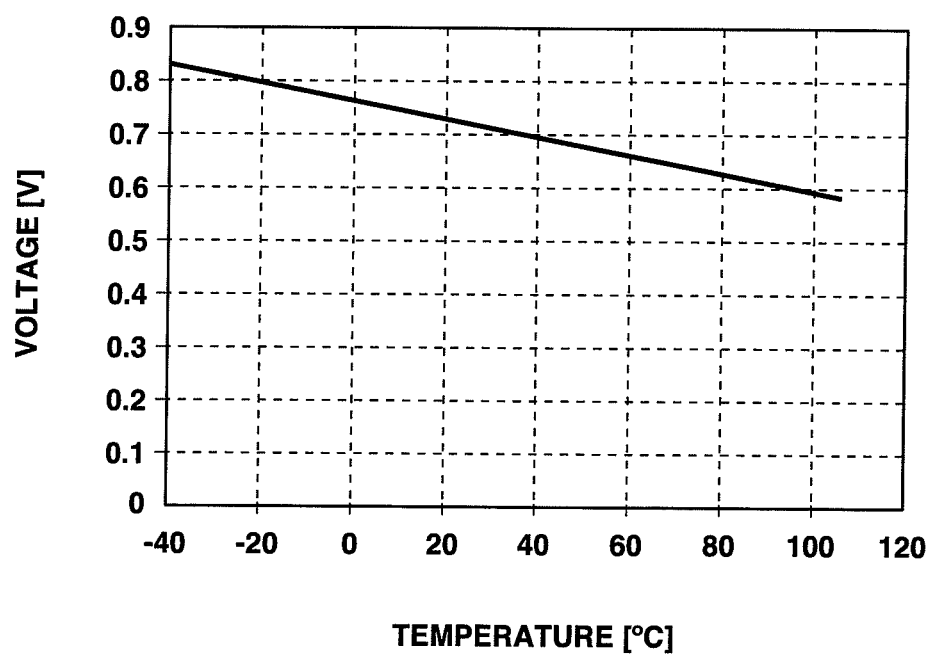
FIG. 8 is a temperature characteristic diagram of a second temperature sensor (diode) of the NOx sensor controller according to the second embodiment of the present invention.

In the second embodiment, the NOx sensor controller 210 (the control circuit 219) uses the diode 153 as a second temperature sensor and has a second signal detection section 215c incorporated in the signal processing circuit block 215 and electrically connected to the diode 153 through signal lines 153b and 153c as shown in FIG. 7. As shown in FIG. 6, the diode 153 is also a constituent part of the signal processing circuit block 215 but is mounted on a second specific region 210d of the circuit board 210b that is different in position from the first specific region 210c of the circuit board 210b. Further, the diode 153 exhibits changes in voltage with changes in temperature as shown in FIG. 8. There thus develops a voltage between terminals of the diode 153 in accordance with a temperature of the second specific region 210d of the circuit board 210b (hereinafter referred to as the "second temperature T2" of the circuit board 210b) by the supply of a constant current from the constant-current supply section 15b to the NOx detection section 23 through the diode 153. The terminal voltage of the diode 153 is outputted as a second signal responsive to the second temperature T2 of the circuit board 210b and amplified by the signal detection section 215c, whereby the microcomputer 11 can determine the second temperature T2 of the circuit board 10b based on the amplified second signal and judge the occurrence or non-occurrence of an output anomaly (failure) in the first temperature sensor 151 based on the first and second temperatures T1 and T2 of the circuit board 210b.

There is also no particular limitation on how to judge the occurrence of the output anomaly (failure) in the first temperature sensor 151 based on the first and second temperatures T1 and T2 of the circuit board 210b in the second embodiment.

The anomaly detection process is executed as follows in the second embodiment by the same procedure as in the first embodiment and as shown in FIG. 5 during the period in which the switch 154 is in connection with the constant-current supply section 15b (i.e. the period in which the second signal is outputted by the diode 153 under the supply of the constant current from the constant-current supply section 15b through the diode 153).

At step S1, the microcomputer 11 receives input of the second signal from the diode (second temperature sensor) 153. The process proceeds to step S2.

At step S2, the microcomputer 11 calculates the second temperature T2 of the circuit board 210b based on the second signal. The process proceeds to step S3.

At step S3, the microcomputer 11 receives input of the first signal from the first temperature sensor 151. The process proceeds to step S4.

At step S4, the microcomputer 11 calculates the first temperature T1 of the circuit board 210b based on the first signal. The process proceeds to step S5.

At step S5, the microcomputer 11 checks whether the temperature difference (the absolute value of the difference) $\Delta T$ (=|T1−T2|) between the first and second temperatures T1 and T2 is within a predetermined range of e.g. 20° C. or smaller. If the temperature difference $\Delta T$ is within the predetermined range (Yes at step S5), the process goes to step S6. If the temperature difference $\Delta T$ is not within the predetermined range (No at step S5), the process goes to step S7.

At step S6, the microcomputer 11 judges that the first temperature sensor 151 is functioning normally. The process then goes to end.

At step S7, the microcomputer 11 judges that the output anomaly (failure) is occurring in the first temperature sensor 151 and outputs to the ECU 30 an sensor anomaly signal indicating the occurrence of the output anomaly (failure) in the first temperature sensor 151. Upon receipt of the sensor anomaly signal, the ECU 30 generates a warning signal (e.g. light signal) to inform a vehicle drive of the occurrence of the occurrence of the output anomaly (failure) in the first temperature sensor 151 and urge the vehicle driver to replace or repair the failed circuit board 10b (NOx sensor system 1). It is therefore possible to detect the first temperature T1 of the circuit board 210b accurately and correct the sensor detection value properly based on the accurately detected first temperature T1 of the circuit board 210b by replacing or repairing the failed circuit board 10b.

The operations of steps S5 to S7 of the microcomputer 11 correspond to an anomaly detection portion (or means) in the second embodiment as in the case of the first embodiment.

It is alternatively feasible to judge that the output anomaly (failure) is occurring in the first temperature sensor 151 upon comparison of the changing trend of the first signal (the trend in which the first temperature T1 increases or decreases) with the changing trend of the second signal (the trend in which the second temperature T2 increases or decreases).

In the second embodiment, the first temperature sensor 151 and the diode (second temperature sensor) 153 are mounted at different positions on the same circuit board 210b of the NOx sensor controller 210. It is accordingly possible to, even under the circumstance that there are external heat generating devices located around the NOx sensor controller 210, decrease and minimize the difference between the influences of heat from the external heat generating device on the first signal of the first temperature sensor 151 and on the second signal of the diode (second temperature sensor) 153 and to detect the output anomaly (failure) in the first temperature sensor 15 properly.

Further, the diode 153 is used not only as the backflow current preventing element but also as the second temperature sensor in the second embodiment. It can also be said that the diode 153 is a multi-functional element having backflow current preventing function and temperature detecting function. The use of such a multi-functional element eliminates the need to provide another temperature detecting element such as a thermistor separately as the second temperature sensor and makes it possible to reduce the number of component parts of the NOx sensor controller 210.

Although the electric circuit elements of the circuit board 210b include a heat generating element 131, the diode 153 is located within a circle C having a radius of A/2 from the first temperature sensor 151 (the distance between the heat generating element 131 and the diode 153 is preferably set to the range of A/2 to 3A/2) where A is the center-to-center distance between the heat generating element 131 and the first temperature sensor 151 as shown in FIG. 6 in the second embodiment. By satisfaction of such a positional relationship, it is possible to decrease the difference between the influences of heat from the heat generating element 131 on the first signal of the first temperature sensor 151 and on the second signal of the diode (second temperature sensor) 153 and detect the output anomaly (failure) in the first temperature sensor 15 properly even when the heat generating element 131 is mounted on the circuit board 210b.

The entire contents of Japanese Patent Application No. 2010-003499 (filed on Jan. 11, 2010) are herein incorporated by reference.

Although the present invention has been described with reference to the above first and second embodiments, the present invention is not limited to these specific exemplary embodiments. Various modification and variation of the embodiments described above will occur to those skilled in the art in light of the above teachings.

For example, the resistive element 152 or the diode 153 is adopted as the functional element with temperature detecting function and any other function or function (current regulating function, backflow current preventing function etc.) so as to serve as the second temperature sensor by means of the temperature detecting function and also serves as the constituent part of the control circuit 19, 219 by means of the other function or functions in the first and second embodiments. However, the multi-functional element is not limited to a resistive element or a diode. Any multi-functional element can be adopted as long as it exhibits changes in electrical property with changes in temperature and thereby has a temperature detecting function and any function or functions other than the temperature detecting function. As such a multi-functional element, there can suitably be used a functional element (such as a resistive element and a diode) whose terminal voltage changes with the temperature thereof, or equivalently, with the second temperature T2 of the circuit board 10b so that the terminal voltage of the functional element can be outputted as the second signal. This secures proper detection of the output anomaly (failure) in the first temperature sensor 151 based on the first signal of the first temperature sensor 151 and the second signal of the second temperature sensor.

In the first and second embodiments, the controller of the present invention is embodied as the NOx sensor controller 10, 210. The controller of the present invention is not however limited to a NOx sensor controller and can be embodied as any vehicle device controller where the detection of a temperature of a circuit board is required. The present invention is applicable to controllers for various vehicle devices such as not only a NOx sensor but also an oxygen sensor, a glow plug, a liquid-state detection device (e.g. urea concentration identification device) and a fuel injection device.

Although the FET of the heater drive circuit block 13 corresponds to the heat generating element 131 in the first and second embodiments, the heat generating element 131 is not limited to a FET. In the case where e.g. a regulator of the power supply circuit block 14 corresponds to the heat generating element 131, the second temperature sensor (e.g. the resistive element 152 or the diode 153) is preferably mounted on the circuit board 10b, 210b at a position within a circle C having a radius of A/2 from the first temperature sensor 151 where A is the center-to-center distance between the first temperature sensor 151 and the heat generating element 131 (regulator).

The scope of the invention is defined with reference to the following claims.

What is claimed is:

1. A controller for controlling a vehicle device, comprising:
a circuit board having mounted thereon a control circuit that controls operations of the vehicle device;
a first temperature sensor mounted on a first specific region of the circuit board to output a first signal responsive to a temperature of the first specific region of the circuit board; and
a second temperature sensor mounted on a second specific region of the circuit board to output a second signal responsive to a temperature of the second specific region of the circuit board,
the control circuit having an anomaly detection portion that judges the occurrence or non-occurrence of an output anomaly in the first temperature sensor based on the first and second signals of the first and second temperature sensors.

2. The controller according to claim 1, wherein the anomaly detection portion calculates a temperature difference between the temperatures of the first and second specific regions of the circuit board from the first and second signals of the first and second temperature sensors and judges the occurrence or non-occurrence of the output anomaly in the first temperature sensor based on the calculated temperature difference.

3. The controller according to claim 1, wherein the circuit board has mounting thereon a heat generating element; and wherein the second temperature sensor is located within a circle having a radius of A/2 from the first temperature sensor where A is a distance between the first temperature sensor and the heat generating element.

4. The controller according to claim 1, wherein the circuit board has mounting thereon a multi-functional element with a temperature detecting function and any function other than the temperature detecting function; and wherein the multi-functional element performs the temperature detecting function to serve as the second temperature sensor while performing the any function other than the temperature detecting function as a constituent part of the control circuit.

5. The controller according to claim 4, wherein the multi-functional element has a terminal voltage that changes with a temperature thereof and outputs the terminal voltage as the second signal.

6. A temperature sensor anomaly detection method for a vehicle device controller, the vehicle device controller having a circuit board mounting thereon a control circuit to control operations of a vehicle device and a temperature sensor mounted on a first specific region of the circuit board to output a signal responsive to a temperature of the first specific region of the circuit board, the temperature sensor anomaly detection method comprising:
mounting a functional element on a second specific region of the circuit board, the functional element having an electrical property that changes with a temperature thereof to output a signal responsive to a temperature of the second specific region of the circuit board; and
judging the occurrence or non-occurrence of an output anomaly in the temperature sensor based on the output signal of the temperature sensor and the output signal of the functional element.

* * * * *